United States Patent
Wang et al.

(10) Patent No.: US 9,647,295 B2
(45) Date of Patent: May 9, 2017

(54) LITHIUM ION SECONDARY BATTERY AND ELECTROLYTE ADDITIVE FOR THE SAME

(71) Applicant: Industrial Technology Research Institute, Hsinchu (TW)

(72) Inventors: Tsung-Hsiung Wang, Taichung (TW); Chung-Liang Chang, Hsinchu (TW); Jing-Pin Pan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 14/133,666

(22) Filed: Dec. 19, 2013

(65) Prior Publication Data

US 2014/0178751 A1    Jun. 26, 2014

(30) Foreign Application Priority Data

Dec. 20, 2012 (TW) .............................. 101148795 A (51) Int. Cl.
| | | |
|---|---|---|
| *H01M 10/0567* | (2010.01) | |
| *H01M 10/0525* | (2010.01) | |
| *C08L 79/08* | (2006.01) | |
| *C08L 101/00* | (2006.01) | |

(52) U.S. Cl.
CPC ... *H01M 10/0567* (2013.01); *H01M 10/0525* (2013.01); *C08L 79/085* (2013.01); *C08L 101/005* (2013.01); *H01M 2300/0025* (2013.01); *H01M 2300/0082* (2013.01); *Y02E 60/122* (2013.01)

(58) Field of Classification Search
CPC ......... H01M 10/0567; H01M 10/0525; H01M 2300/0025; H01M 2300/0082; Y02E 60/122; C08L 101/005; C08L 79/085
See application file for complete search history.

(56) References Cited

U.S. PATENT DOCUMENTS

| | | | |
|---|---|---|---|
| 5,879,834 A | 3/1999 | Mao | |
| 6,074,776 A | 6/2000 | Mao et al. | |
| 8,142,936 B2 | 3/2012 | Ahn et al. | |
| 8,173,298 B2 | 5/2012 | Kim et al. | |
| 2007/0141475 A1 | 6/2007 | Ahn et al. | |
| 2008/0157021 A1* | 7/2008 | Wang ............... | C08G 73/12 252/62.2 |

(Continued)

FOREIGN PATENT DOCUMENTS

| | | |
|---|---|---|
| CN | 1801518 | 7/2006 |
| CN | 101145622 | 3/2008 |

(Continued)

OTHER PUBLICATIONS

Notification to grant the Patent issued by SIPO on Aug. 24, 2016.*

(Continued)

*Primary Examiner* — Alex Usyatinsky
(74) *Attorney, Agent, or Firm* — Jianq Chyun IP Office (57) ABSTRACT

Provided is an electrolyte additive for a lithium ion secondary battery including an organic lithium compound and a hyper-branched structure material. The electrolyte additive enhances the decomposition voltage of the electrolyte up to 5.5 V, and increases the heat endurable temperature by 10° C. or more. The safety of the battery is thus improved.

18 Claims, 4 Drawing Sheets

(56) References Cited

U.S. PATENT DOCUMENTS

| | | | | |
|---|---|---|---|---|
| 2008/0160404 | A1* | 7/2008 | Lin | H01M 10/052 429/189 |
| 2008/0160418 | A1* | 7/2008 | Pan | H01M 10/0525 429/328 |
| 2009/0142670 | A1* | 6/2009 | Wang | H01M 2/162 429/330 |
| 2011/0136019 | A1* | 6/2011 | Amiruddin | H01M 10/0567 429/332 |
| 2012/0171576 | A1 | 7/2012 | Tsai et al. | |

FOREIGN PATENT DOCUMENTS

| | | |
|---|---|---|
| CN | 101212065 | 7/2008 |
| CN | 101375459 | 2/2009 |
| CN | 101882696 | 11/2010 |
| JP | H11219723 | 8/1999 |
| TW | I250678 | 3/2006 |
| TW | I323951 | 4/2010 |
| TW | 201248969 | 12/2012 |

OTHER PUBLICATIONS

JP11-219723MT(Aug. 8, 2010).*
CN101212065MT(Jul. 2, 2008).*
"Office Action of Taiwan Counterpart Application", issued on Dec. 3, 2014, p. 1-p. 3.
Sheng Shui Zhang, "A review on electrolyteadditives for lithium-ion batteries," Journal of Power Sources, Oct. 10, 2006, pp. 1379-1394.
S. L. Li, et al., "Diphenylamine: A safety electrolyte additive for reversible overcharge protection of 3.6 V-class lithium ion batteries," Journal of Power Sources, Feb. 26, 2008, pp. 553-556.
Kunihisa Shima, et al., "Reaction mechanisms of aromatic compounds as an overcharge protection agent for 4 V class lithium-ion cells," Journal of Power Sources, Jul. 7, 2006, pp. 1264-1274.
Lifen Xiao, et al., "Electrochemical behavior of biphenyl as polymerizable additive for overcharge protection of lithium ion batteries," Electrochimica Acta, May 28, 2004, pp. 4189-4196.
J. R. Dahn, et al., "High-rate Overcharge Protection of LiFePO4-Based Li-Ion Cells Using the Redox Shuttle Additive 2,5-Ditertbutyl-1,4-dimethoxybenzene," Journal of The Electrochemical Society, vol. 152, Issue 6, May 16, 2005, pp. A1283-A1289.

* cited by examiner

LITHIUM ION SECONDARY BATTERY AND ELECTROLYTE ADDITIVE FOR THE SAME

CROSS-REFERENCE TO RELATED APPLICATION

This application claims the priority benefit of Taiwan application serial no. 101148795, filed on Dec. 20, 2012. The entirety of the above-mentioned patent application is hereby incorporated by reference herein and made a part of this specification.

TECHNICAL FIELD

The technical field relates to a lithium ion secondary battery and an electrolyte additive for the same.

BACKGROUND

Almost all current portable electronic devices rely on rechargeable lithium ion secondary batteries for power. A variety of continuous development efforts of the lithium ion secondary battery have therefore emerged, such as increasing the capacitance capability, power capacity, service life, safety features, and reducing the cost.

The safety concerns of the lithium ion secondary battery mainly result from an increase in the internal temperature of the battery, including improper heating of the battery, overcharging, and short circuit due to contact of the positive and negative electrode materials. When the internal temperature of the battery continuously rises and can not be suppressed, the separator film used to separate the positive and negative electrode materials melts and becomes punctured, leading to excessive short-circuit current, and therefore accelerating the heat build-up of the battery. When the battery temperature reaches 180° C., decomposition reactions of the electrolyte solution and the positive electrode material occur, thereby generating intense heat and releasing large amounts of gas and causing dangers such as fire and explosion.

It is therefore known that, the safety of the lithium ion secondary battery is related to the decomposition voltage of the electrolyte solution and the temperature at which the electrolyte solution experiences thermal fluctuations and damages the dynamic buffer system. The higher the temperature at which the electrolyte solution experiences thermal fluctuations and damages the dynamic buffer system (indicating better high-temperature tolerance), the greater the decomposition voltage of the electrolyte solution (indicating better overcharge tolerance), and consequently the better the safety of the lithium ion secondary battery. Therefore, an electrolyte additive for enhancing the safety of the lithium ion secondary battery is desired to ensure the safety of use for the consumer.

SUMMARY

The disclosure provides an electrolyte additive for a lithium ion secondary battery, wherein the electrolyte additive includes a nitrogen-containing organic lithium compound and a hyper-branched structure material.

The disclosure also provides a lithium ion secondary battery including a positive electrode, a negative electrode, a separator film, an electrolyte solution, and an electrolyte additive, wherein the electrolyte additive includes a nitrogen-containing organic lithium compound and a hyper-branched structure material.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of the specification. The drawings illustrate embodiments of the disclosure and, together with the description, serve to explain the principles of the disclosure.

DETAILED DESCRIPTION OF DISCLOSED EMBODIMENTS

Figure 1:
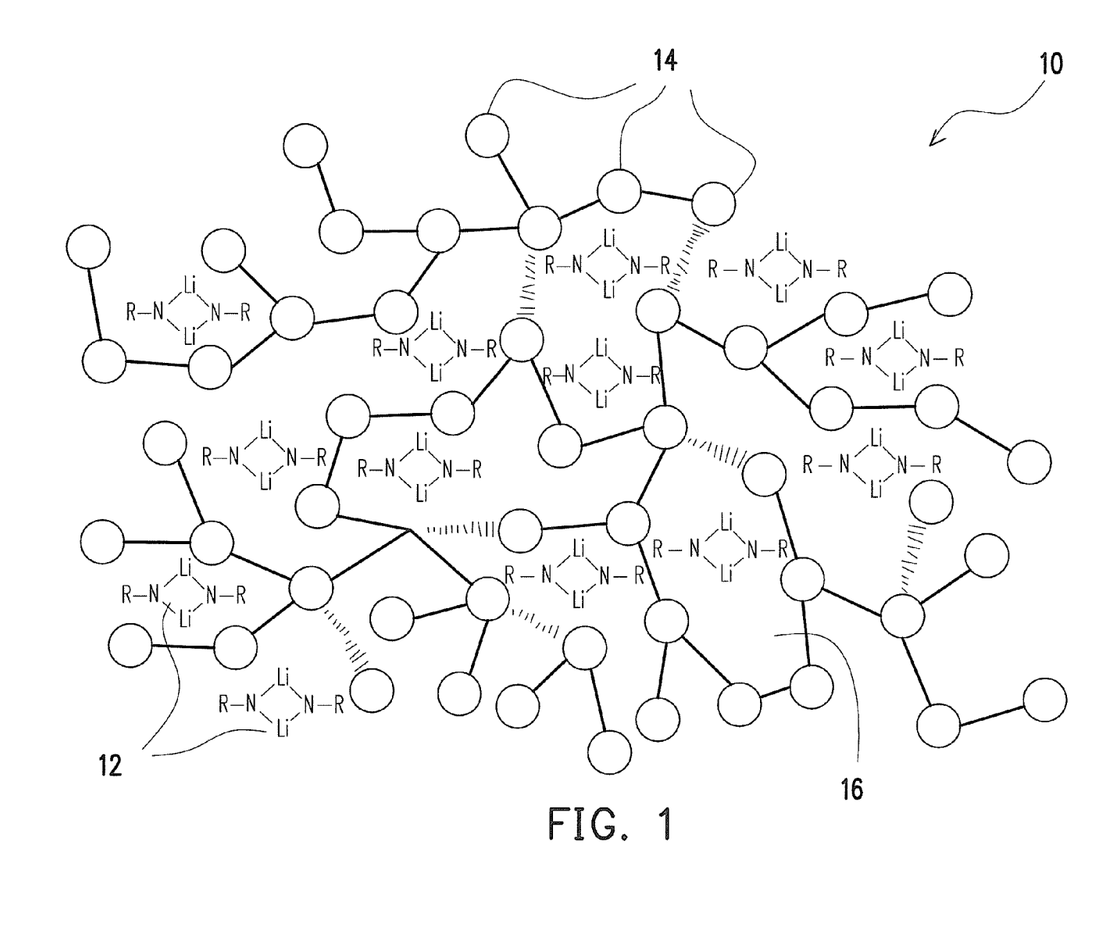
FIG. 1 is a schematic diagram illustrating an electrolyte additive for a lithium ion secondary battery according to an embodiment of the disclosure.

FIG. 1 is a schematic diagram illustrating an electrolyte additive for a lithium ion secondary battery according to an embodiment of the disclosure. Referring to FIG. 1, the electrolyte additive 10 for a lithium ion secondary battery includes an organic lithium compound 12 and a hyper-branched structure material 14. Herein, the material formed from the combination of the organic lithium compound and the hyper-branched structure material is referred to as a "hyper-branched structure material containing organic lithium".

As illustrated in FIG. 1, the organic lithium compound 12 is, for instance, physically adsorbed in the pore 16 of the hyper-branched structure material 14 or on the surface of the hyper-branched structure material 14. The organic lithium compound 12 is not chemically bonded to the hyper-branched structure material 14, but due to the hydrogen bonds or the van der Waals forces between the two, the hyper-branched structure material 14 can trap the organic lithium compound 12 therein. In particular, the particle size diameter of the hyper-branched structure material is about 50 nm, the particle size diameter of the organic lithium compound is about 0.3-3 nm, and the pore size of the hyper-branched structure material is about 1-10 nm.

The term "organic lithium compound" refers to a non-lithium-salt type lithium-containing organic compound. Specifically, the organic lithium compound of the disclosure is not dissociated in the electrolyte solution. In an embodiment, the organic lithium compound is a nitrogen-containing organic lithium compound, wherein a lithium element is bonded to a nitrogen element. Moreover, the nitrogen-containing organic lithium compound further includes at least one element selected from silicon, sulfur, and oxygen. In other words, the organic lithium compound of the disclosure can be a nitrogen-containing organic lithium compound, a nitrogen/silicon-containing organic lithium compound, a nitrogen/sulfur-containing organic lithium compound, or a nitrogen/oxygen-containing organic lithium compound.

The number n of lithium elements in the organic lithium compound can be one or more. The disclosure does not limit the number n of the lithium elements. In an embodiment, the organic lithium compound is represented by one of Formulas (1) to (6):

Formula (1)

n = 1

Formula (2)

n = 2

Formula (3)

n = 3

Formula (4)

n = 4

Formula (5)

n = 4

Formula (6)

n = 5 wherein $R_1$ includes methyl, ethyl, propyl, isopropyl, butyl, or phenyl; and $R_2$ to $R_{16}$ each independently include methyl, ethyl, propyl, isopropyl, butyl, phenyl, diisopropylamide, -p-(t-butyl)$_3$, or -p-(phenyl)$_3$. The specific structural formulas of -p-(t-butyl)$_3$ and -p-(phenyl)$_3$ are as illustrated below:

-p-(t-butyl)

-p-(phenyl)$_3$

For instance, when the number n of lithium elements is 1, the specific compounds of the organic lithium compound are as illustrated in Formula (7) to Formula (8). When the number n of lithium elements is 2, the specific compound of the organic lithium compound is as illustrated in Formula (9).

Formula (7)

lithium bis(trifluoromethanesulfonyl)amide; LiTFSA
[Tokyo Chemical Industry Co.] (CAS NO: 90076-65-6)

Formula (8)

lithium tetramethylpiperidide
[FMC Lithium] (CAS NO: 38227-87-1)

Formula (9)

lithium bis(trimethylsilyl)amide; lithium hexamethyldisilazide
[Sigma-Aldrich Co. LLC] (CAS NO: 4039-32-1)

In an embodiment, the organic lithium compound can be synthesized instead of purchased from the market.

The term "hyper-branched structure material" refers to a nitrogen-containing hyper-branched polymer including at least three branch points, and the degree of branching (DB) is at least greater than 50%.

The monomer of the hyper-branched structure material of the disclosure is at least one compound selected from the group consisting of maleimide, bismaleimide, multi-maleimide, barbituric acid, imidazole, pyrrole, pyridine, pyridazine, pyrimindine, pyradine, triazine, and derivatives thereof.

For instance, bismaleimide can be represented by Formula (10), multi-maleimide can be represented by Formula (11), and barbituric acid can be represented by Formula (12).

4,4'-diphenylmethane bismaleimide (BMI-1000)
[Hakuei & Co., Ltd] (CAS NO): 13676-54-5)

Formula (10)

oligomer of phenylmethane maleimide (BMI-2300)
[Daiwakasei Industry Co., Ltd] (CAS NO: 67784-74-1)

Formula (11)

barbituric acid (BTA)
[Alfa Aesar] (CAS NO: 67-52-7)

Formula (12)

Moreover, the weight ratio of the organic lithium compound to the hyper-branched structure material is about 1:99 to 99:1, such as about 1:4 to 4:1.

Electrolyte Solution and Preparation Method Thereof

The electrolyte solution of the disclosure includes lithium salt, an organic solvent, and the electrolyte additive as described above, wherein the electrolyte additive accounts for about 0.1 wt % to 10 wt % of the total weight of the electrolyte solution, such as about 0.5 wt % to 5 wt %.

The lithium salt includes $LiPF_6$, $LiClO_4$, $LiBF_4$, $LiSO_3CF_3$, $LiN(SO_2CF_3)_2$, $LiN(SO_2CF_2CF_3)_2$, LiTFSI, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F_5SO_3$, $LiO_2CCF_3$, $LiSO_3F$, $LiB(C_6H_5)_4$, $LiB(C_2O_4)_2$, or a combination thereof. The concentration of the lithium salt is between 0.5-1.5 mol/L (M).

The organic solvent includes carbonate, ester, ether, ketone, or a combination thereof. The ester is selected from the group consisting of methyl acetate, ethyl acetate, methyl butyrate, ethyl butyrate, methyl propionate, ethyl propionate, and propyl acetate (PA). The carbonate includes ethylene carbonate (EC), propylene carbonate (PC), diethyl carbonate (DEC), ethyl methyl carbonate (EMC), dimethyl carbonate (DMC), vinylene carbonate, butylene carbonate, dipropyl carbonate, or a combination thereof.

A better ratio of the electrolyte solvents can be obtained by conducting $^1$H-NMR diffusion coefficient measurements of the three organic solvents DEC, EC, and PC of the electrolyte solution. Single, two and multiple components of the three organic solvents DEC, EC, and PC are tested, seventeen testing points are designed to conduct the NMR diffusion measurements. According to the trend analysis of the experimental data, different levels of interaction exist among the organic solvents, so that the self-diffusion of the solvent body is constrained and the self-diffusion rate is reduced. Moreover, the constraining effect of the three-solvent system is greater than the constraining effect of the two-solvent system, and the three-solvent system consistently and relatively reduces the effect of self-diffusion. In particular, in the case that the three-solvent system is used for consideration, when DEC, EC, and PC are mixed in a (weight) ratio of 5:3:2, the three-solvent system will have a higher diffusion coefficient, which is close to about $12.5 \times 10^{-10}$ m$^2$/sec.

In the electrolyte solution of the disclosure, by adding the hyper-branched structure material containing organic lithium as an electrolyte additive, the decomposition voltage of the electrolyte solution can be enhanced to 5.5 V, and the temperature at which the electrolyte solution experiences thermal fluctuations and damages the dynamic buffer system is increased by at least 10° C. The safety of the battery is thus improved.

The preparation method of the electrolyte solution includes mixing a plurality of organic solvents in a specific weight ratio to form a mixture solution. Then, a lithium salt having a specific concentration is added to the mixture solution. Afterwards, the hyper-branched structure material containing organic lithium as an electrolyte additive is added, wherein the electrolyte additive accounts for about 0.1 wt % to 10 wt % of the total weight of the electrolyte solution.

Lithium Ion Secondary Battery and Preparation Method Thereof

The lithium ion secondary battery includes a positive electrode, a negative electrode, a separator film, and an electrolyte solution. The preparation of the electrolyte solution is as described above, and is not repeated herein.

A positive electrode slurry is formed by dissolving a positive electrode active substance, a conductive additive, and a binder in N-methyl-2-pyrollidone (NMP) respectively in the amounts of 80-94%, 3-15%, and 3-10%. Next, the positive electrode slurry is uniformly coated on a 300 m-long, 35 cm-wide, and 20 μm-thick aluminum foil roll. After drying, the positive electrode roll is compacted by rolling and cut into strips, and finally dried under vacuum at 110° C. for 4 hours. A positive electrode is thus obtained. The positive electrode active substance can be lithiated oxide, lithiated sulfide, lithiated selenide, and lithiated telluride of vanadium, titanium, chromium, copper, molybdenum, niobium, iron, nickel, cobalt or manganese, or a combination thereof. The conductive additive can be carbon black, graphite, acetylene black, nickel powder, aluminum powder, titanium powder, stainless steel powder, or a combination thereof. The binder can be a fluorine-containing resin binder, for instance, polyvinylidene fluoride (PVDF), Teflon, styrene-butadiene rubber, polyamide resin, melamine resin, or carboxymethylcellulose (CMC) binder.

A negative electrode slurry is formed by dissolving a negative electrode active substance having a diameter of 1-30 μm and a binder in N-methyl-2-pyrollidone (NMP) respectively in the amounts of 90-97% and 3-10%. After stirring uniformly, the negative electrode slurry is coated on a 300 m-long, 35 cm-wide, and 10 μm-thick copper foil roll. The formed negative electrode roll is compacted by rolling and cut into strips, and similarly dried under vacuum drying at 110° C. for 4 hours. A negative electrode is thus obtained. The negative electrode active substance can be mesophase carbon micro beads (MCMB), vapor grown carbon fiber (VGCF), carbon nano tubes (CNT), coke, carbon black, graphite, acetylene black, carbon fiber, glassy carbon, lithium alloy, or a combination thereof. The negative plate can further include a metal oxide such as SnO, SnO2, GeO, GeO$_2$, In$_2$O, In$_2$O$_3$, PbO, PbO$_2$, Pb$_2$O$_3$, Pb$_3$O$_4$, AgO, Ag$_2$O, Ag$_2$O$_3$, Sb$_2$O$_3$, Sb$_2$O$_4$, Sb$_2$O$_5$, SiO, ZnO, CoO, NiO, FeO, TiO$_2$, Li$_3$Ti$_5$O$_{12}$, or a combination thereof. The binder can be a fluorine-containing resin binder, for instance, polyvinylidene fluoride (PVDF), Teflon, styrene-butadiene rubber, polyamide resin, melamine resin, or carboxymethylcellulose (CMC) binder.

Alternatively, when a metal sheet is directly used as a negative electrode, the material of the negative electrode can be Al, Zn, Bi, Cd, Sb, Si, Pb, Sn, Li$_3$FeN$_2$, Li$_{2.6}$Co$_{0.4}$N, Li$_{2.6}$Cu$_{0.4}$N, or a combination thereof.

The separator film is a polypropylene/polyethylene/propylene (PP/PE/PP) triple-layer film of 15-20 μm thick.

The method for preparing the lithium secondary battery includes winding the positive electrode, the negative electrode, and the separator film together, and compacting by rolling, and then placing into a rectangular housing of aluminum foil bag having a size of 38 mm×3.5 mm×62 mm. Finally, the electrolyte is injected as described above.

In the following, a plurality of embodiments and comparative embodiments are enumerated to validate the efficacy of the disclosure.

Preparation of Electrolyte Additive

Embodiment 1

200 grams of propylene carbonate 99% (PC, purchased from Alfa Aesar) is taken and put in a 500 ml four-neck round bottom flask (one neck is connected to a condenser tube, another neck is connected to a temperature probe). Nitrogen is introduced into the flask, and then the flask is heated to 130° C. Afterwards, 12.5078 grams of barbituric acid 99% (BTA, purchased from Alfa Aesar, CAS NO. 67-52-7) is added and stirred to dissolve in PC at 130° C. for 20 minutes. Then, 34.9922 grams of 4,4'-diphenylmethane bismaleimide 95% (BMI, BMI-1000, purchased from Hajuei&Co., Ltd, CAS No. 13676-54-5) is added and continuously stirred to dissolve and react, wherein the molar ratio of BMI-1000 to BTA is 1:1. After BMI-1000 and BTA are reacted in PC at 130° C. for 3 hours, 2.5 grams of lithium bis(trimethylsilyl)amide (purchased from Sigma-Aldrich Co. LLC, CAS NO. 4039-32-1) is added and continuously stirred to dissolve and react until 15 hours. Here, the hyper-branched structure material containing organic lithium of embodiment 1 is obtained, wherein the total solid content accounts for 20 wt % of the resulting solution, and the organic lithium accounts for 5 wt % of the total solid content.

Embodiment 2

200 grams of propylene carbonate 99% (PC, purchased from Alfa Aesar) is taken and put in a 500 ml four-neck round bottom flask (one neck is connected to a condenser tube, another neck is connected to a temperature probe). Nitrogen is introduced into the flask, and then the flask is heated to 130° C. Afterwards, 38.1770 grams of 4,4'-diphenylmethane bismaleimide 95% (BMI; BMI-1000, purchased from Hajuei&Co., Ltd, CAS NO. 13676-54-5) is added and stirred to dissolve in PC at 130° C. for 15 minutes. Then, 6.8230 grams of barbituric acid 99% (BTA, purchased from Alfa Aesar, CAS NO. 67-52-7) is added in four batches (with an interval of 15 minutes between batches) and continuously stirred to dissolve and react, wherein the molar ratio of BMI-1000 to BTA is 2:1. After the four batches of BTA are added, BMI-1000 and BTA are left in PC to continuously react at 130° C. for 15 minutes. Then, 5.0 grams of lithium bis(trifluoromethanesulfonyl)amide (purchased from Tokyo Chemical Industry Co., CAS NO. 90076-65-6) is added and continuously stirred to dissolve and react until 4 hours. Here, the hyper-branched structure material containing organic lithium of embodiment 2 is obtained, wherein the total solid content accounts for 20 wt % of the resulting solution, and the organic lithium accounts for 10 wt % of the total solid content.

The hyper-branched structure material containing organic lithium of each of embodiment 1 and embodiment 2 is analyzed using gel permeation chromatography (GPC), wherein a GPC system having a DMF solvent reflux system is selected for use. The analysis conditions of the GPC test include a column system of DG/KD-801/KD-802/KD-802/KD-802.5, a column oven temperature of 40° C., and a flow rate of 0.8 ml/min.

Figure 2:
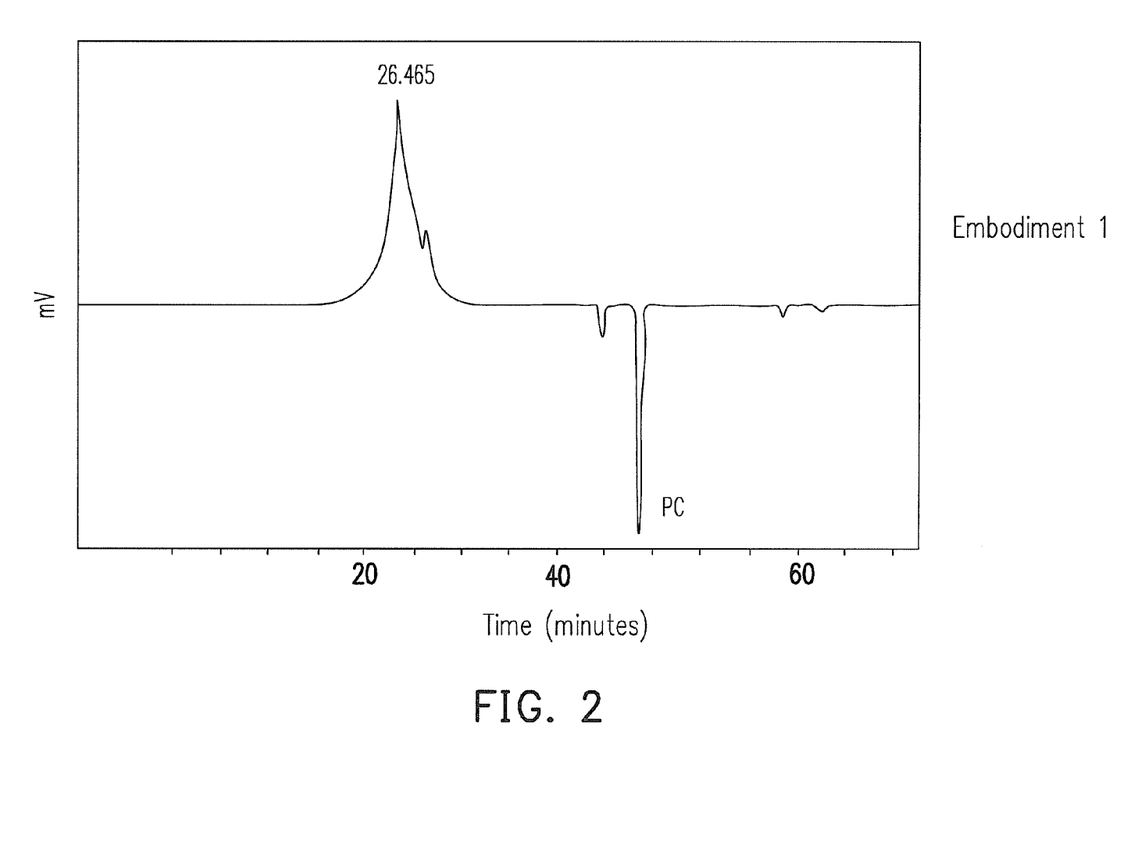
FIG. 2 is a GPC diagram of a hyper-branched structure material containing organic lithium of embodiment 1.
Figure 3:
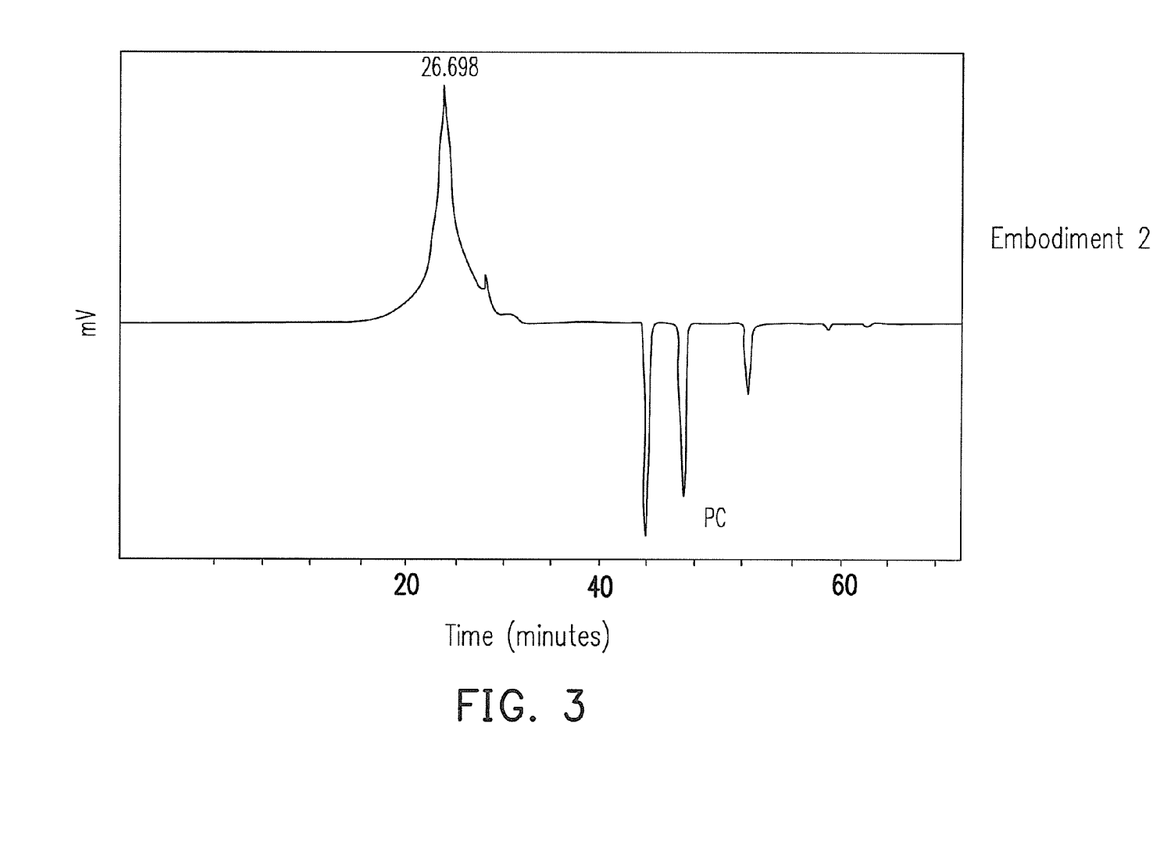
FIG. 3 is a GPC diagram of a hyper-branched structure material containing organic lithium of embodiment 2.

FIG. 2 is a GPC diagram of the hyper-branched structure material containing organic lithium of embodiment 1, wherein the GPC peak time is 26.465 minutes. FIG. 3 is a GPC diagram of the hyper-branched structure material containing organic lithium of embodiment 2, wherein the GPC peak time is 26.698 minutes.

The GPC analysis results of FIG. 2 and FIG. 3 correspond to the schematic diagram of FIG. 1 of the disclosure. In the hyper-branched structure material containing organic lithium of the disclosure, the organic lithium compound is not chemically bonded to the hyper-branched structure material, but due to the hydrogen bonds or the van der Waals forces between the two, the hyper-branched structure material can trap the organic lithium compound therein to render the two as a whole. Therefore, the GPC analysis results only show one peak time (i.e. the peak time of the hyper-branched structure material containing organic lithium), rather than multiple individual peak times.

Preparation of Electrolyte Solution

Embodiment 3

The electrolyte solution is formed by dissolving 1.2M of LiPF$_6$ in the mixture solution containing PC, EC, and DEC (weight ratio of EC/PC/DEC=3/2/5), and the hyper-branched structure material containing lithium of embodiment 1 as an electrolyte additive accounts for 0.5 wt % of the electrolyte solution. Here, the electrolyte solution of embodiment 3 is obtained.

Embodiment 4

The electrolyte solution is formed by dissolving 1.2M of LiPF$_6$ in the mixture solution containing PC, EC, and DEC (weight ratio of EC/PC/DEC=3/2/5), and the hyper-branched structure material containing lithium of embodiment 2 as an electrolyte additive accounts for 2 wt % of the electrolyte solution. Here, the electrolyte solution of embodiment 4 is obtained.

Comparative Embodiment 1

The electrolyte solution is formed by dissolving 1.2M of LiPF$_6$ in the mixture solution containing PC, EC, and DEC (weight ratio of EC/PC/DEC=3/2/5), and no electrolyte additive is used. Here, the electrolyte solution of comparative embodiment 1 is obtained.

Before LiPF$_6$ lithium salt is added, each solvent of the EC/PC/DEC solvent system is be affected by the interaction of the other solvent ingredients, so as to achieve a constrained dynamic equilibrium. After LiPF$_6$ lithium salt is added, the dynamic equilibrium of the entire DEC/EC/PC solvent system is significantly affected, so as to achieve another constrained dynamic equilibrium. Moreover, a more apparent difference in the diffusion coefficient of each component solvent can be observed, and different levels of solvation coordination between the lithium salt which is strong electrolytic and the organic solvent ingredients can also be observed.

After the hyper-branched structure material containing organic lithium as an electrolyte additive is added/not added, the electrolyte solutions of embodiment 3, embodiment 4, and comparative embodiment 1 are analyzed using nuclear magnetic resonance spectroscopy (NMR), wherein a high-resolution liquid state Bruker Avance-400 and Varian INOVA-500 NMR are selected for use. A test for detecting the relationship between temperature (30-110° C.) and in-situ $^1$H-NMR diffusion coefficient of propylene carbonate (PC) at the position PC-1H is conducted, and the analysis results are as illustrated in Table 1 and FIG. 4.

TABLE 1

| Diffusion Coefficient | Temperature (° C.) | | | | | | | | |
|---|---|---|---|---|---|---|---|---|---|
| $10^{-10}$ m$^2$/sec) | 30 | 40 | 50 | 60 | 70 | 80 | 90 | 100 | 110 |
| Comparative Embodiment 1 | 3.24 | 5.27 | 8.56 | 12.04 | 13.51 | 35.72 | 54.12 | 97.57 | 185.38 |
| Embodiment 3 | 3.32 | 5.03 | 8.51 | 13.89 | 14.34 | 16.76 | 30.05 | 46.24 | 78.83 |
| Embodiment 4 | 3.33 | 4.94 | 8.24 | 14.3 | 14.66 | 15.23 | 16.55 | 18.06 | 30.05 |

Figure 4:
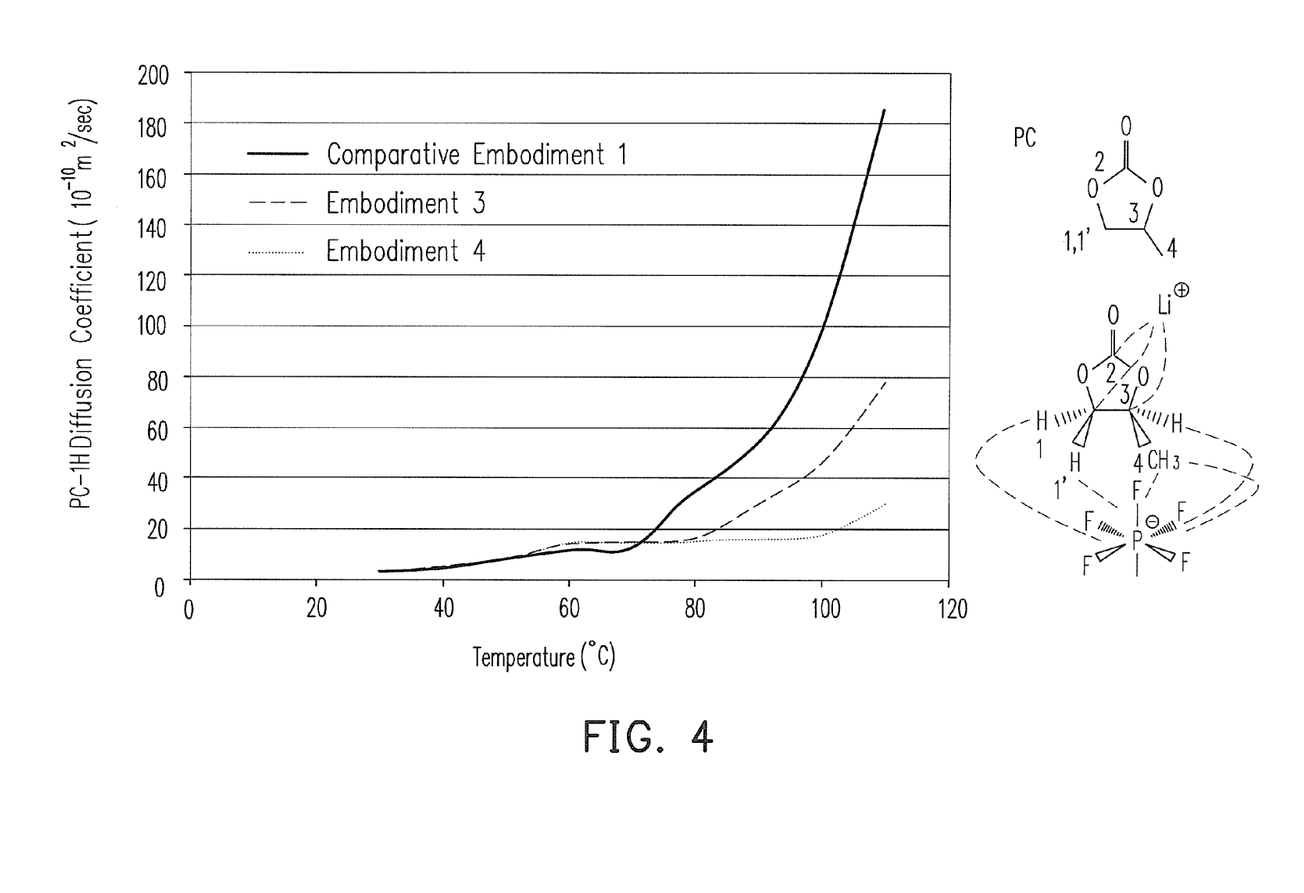
FIG. 4 is a diagram illustrating the relationship between temperature and in-situ $^1$H-NMR self-diffusion coefficient of propylene carbonate (PC) of each of embodiment 3, embodiment 4, and comparative embodiment 1.

As shown in the results of Table 1 and FIG. 4, when the temperature of the electrolyte solution of comparative embodiment 1 exceeds 70° C., the diffusion coefficient of PC-1H is raised significantly, indicating that the buffer steady-state equilibrium is damaged because the restraining effect between the solvent ingredients and the lithium salt in the electrolyte solution is broken by thermal interference. Consequently, the solvent ingredients regress to their individual movements, causing the entire electrolyte solution system to be unable to maintain the electrochemical steady-state mechanism and to form multiple electric double-layer structures in the electrolyte solution. As a result, the internal resistance is increased significantly and the overall performance of the battery is lowered. On the other hand, the test results of the electrolyte solutions of embodiment 3 and embodiment 4 show that, after the hyper-branched structure material containing organic lithium is added, the temperature at which the electrolyte solution experiences thermal fluctuations and damages the dynamic buffer system can be increased. The addition of 0.5 wt % of the hyper-branched structure material containing organic lithium (embodiment 3) can increase the temperature by about 10° C., and the addition of 2 wt % of the hyper-branched structure material containing organic lithium (embodiment 4) can increase the temperature by about 30° C.

Preparation of Lithium Half-Cell

Embodiment 5

Two coin batteries (size CR2032) were assembled, wherein LiCoO$_2$ (weight ratio of LiCoO$_2$:super P carbon black:PVDF binder=94:3:3) is used as a positive electrode, a lithium metal is used as a negative electrode, and a PP/PE/PP triple-layer film (product name Celgard 2325) is used as a separator film. The electrolyte solution of embodiment 3 is used in the preparation of the electrolyte solution of the present embodiment. Here, the lithium half-cell of embodiment 5 is obtained.

Embodiment 6

Two coin batteries (size CR2032) were assembled, wherein LiCoO$_2$ (weight ratio of LiCoO$_2$:super P carbon black:PVDF binder=94:3:3) is used as a positive electrode, a lithium metal is used as a negative electrode, and a PP/PE/PP triple-layer film (product name Celgard 2325) is used as a separator film. The electrolyte solution of embodiment 4 is used in the preparation of the electrolyte solution of the present embodiment. Here, the lithium half-cell of embodiment 6 is obtained.

Comparative Embodiment 2

Two coin batteries (size CR2032) were assembled, wherein LiCoO$_2$ (weight ratio of LiCoO$_2$:super P carbon black:PVDF binder=94:3:3) is used as a positive electrode, a lithium metal is used as a negative electrode, and a PP/PE/PP triple-layer film (product name Celgard 2325) is used as a separator film. The electrolyte solution of comparative embodiment 1 is used in the preparation of the electrolyte solution of the present embodiment. Here, the lithium half-cell of comparative embodiment 2 is obtained.

A decomposition voltage test is conducted on the lithium half-cells of embodiment 5, embodiment 6, and comparative embodiment 2. Linear sweep voltammetry (LSV) includes continuously testing a current passing through a battery or an electrode, and recording the variation of the potential over time. Here, the decomposition voltage of the electrolyte solution is measured with AUTOLAB between 3V and 6V at a scan rate of 0.5 my/s.

Moreover, a high-voltage overcharge test at 6 C/30V is conducted, and a scanning electron microscope/energy dispersive spectrometer (SEM/EDS) is used to observe and analyze the elements of the positive electrode and the contents of the elements.

The SEM/EDS analysis results show that, before the high-voltage overcharge test is conducted and before lithium ions are extracted, regardless of the lithium metal oxide (used as a positive electrode material) with/without the hyper-branched structure material containing organic lithium, the ratio of the total amount of oxygen elements to metal elements (not including lithium elements) is about 4 (average value of six testing area points). After the high-voltage overcharge test under the conditions of 6 C/30V (the lithium ions are extracted), the ratio of the total amount of oxygen elements to metal elements (not including lithium elements) of the lithium metal oxide (used as a positive electrode material) without the hyper-branched structure material containing organic lithium is decreased from the original 4 to 1.8, indicating that the relative oxygen release exceeds 50%. On the other hand, when the lithium metal oxide (used as a positive electrode material) with the hyper-branched structure material containing organic lithium is used, the ratio of the total amount of oxygen elements to metal elements (not including lithium elements) is only decreased from the original 4 to 3.7 (the additive content is 0.5 wt %), indicating that the relative oxygen release is less than 10%. Moreover, when the ratio of the total amount of oxygen elements to metal elements (not including lithium elements) is close to 4 (the additive content is 2 wt %), the relative oxygen release is less than 5%.

When there is too much oxygen release from the lithium metal oxide used as a positive electrode material, the structure becomes highly disintegrated, causing an increase in the irreversible rate and a significant decrease in battery performance. The release of oxygen from the lithium metal oxide used as a positive electrode material is also a main cause for the battery to catch fire and explode due to thermal run-away. If the oxygen release is effectively reduced, the original structural system can be maintained, and the risk of the battery catching fire and exploding due to thermal run-away can also be reduced. Thus, the safety performance of the battery is improved. It is known from the SEM/EDS analysis that, the relative oxygen release from the metal oxide can be decreased significantly from the original greater than 50% to 5-10%.

tural toughness thereon. The SEI films can protect the electrode materials and prevent lithium from releasing from the electrodes and combining to the SEI films. The irreversibility rate is thus reduced, and the high-and-low temperature cycle life of the battery is increased. As a result, the security structure network is constructed so as to improve the thermal tolerance and overcharge tolerance properties of the battery.

Based on the above, with the coordination of field effect of the hyper-branched structure material additive containing organic lithium toward the lithium salt and organic solvent system, the hyper-branched structure material additive containing organic lithium can strengthen and maintain the dynamic balancing system composed of electrolyte solution-related materials. The electrochemical and thermal tolerance stabilities of the electrolyte solution are thus improved, and the charge and discharge performance of the battery and the steady-state buffer mechanism performance of the electrolyte solution are enhanced. Moreover, when the battery voltage exceeds the electro-polymerization voltage of the additive, the electro-polymerizable hyper-branched structure material in the additive is polymerized, and a passivation layer is formed on the surface of the electrode. The passivation layer causes the internal resistance of the battery to increase rapidly, which retards or prevents further decomposition of the electrolyte solution, blocks the effect of thermal run-away and keeps the battery and the electrolyte solution in a safe state.

TABLE 2

| | Comparative Embodiment 2 | Embodiment 5 | Embodiment 6 |
|---|---|---|---|
| Decomposition voltage of electrolyte solution | about 4.5 V | about 4.9 V | about 5.5 V |
| Structural strength and toughness of SEI film | Poor | Good | Good |
| Temperature at which the electrolyte solution experiences thermal fluctuations and damages the dynamic buffer system | <70° C. | >80° C. | >100° C. |
| High-voltage overcharge test (6 C/30 V) (SEM/EDS analysis) | High oxygen release from electrode, which causes structure to be highly disintegrated (Relative oxygen release from metal oxide greater than 50%) | Low oxygen release, structure can be maintained (Relative oxygen release from metal oxide less than 10%) | Low oxygen release, structure can be maintained (Relative oxygen release from metal oxide less than 5%) |

As shown in the results of embodiment 5 and embodiment 6 in Table 2, the hyper-branched polymer structure material additive containing organic lithium has good miscibility toward the electrolyte solution. Moreover, after charging, a solid electrolyte interface (SEI) film with a thickness of several nanometers can be formed on the surface of each of the positive and negative electrodes, wherein the SEI films show excellent structural strength and toughness. Moreover, the hyper-branched polymer structure material additive containing organic lithium may also reduce the solvent effect toward lithium ions, maintain and stabilize the chemical stability of the electrolyte solution, and form ionic-like liquid channels. Moreover, when the additive is added to the electrolyte solution for the lithium ion secondary battery and when a certain voltage is reached during charging, the additive reacts with the positive and negative electrode materials to form SEI films having high quality and struc-

Although the disclosure has been described with reference to the above embodiments, it will be apparent to one of ordinary skill in the art that modifications and variations to the described embodiments can be made without departing from the spirit and scope of the disclosure. Accordingly, the scope of the disclosure will be defined by the attached claims not by the above detailed descriptions.

What is claimed is:

1. An electrolyte additive for a lithium ion secondary battery, comprising:
   a nitrogen-containing organic lithium compound; and
   a hyper-branched structure material,
   wherein the nitrogen-containing organic lithium compound is represented by one of Formulas (1), (2) and (8):

Formula (1)

Formula (2)

Formula (8)

wherein $R_1$ is selected from the group consisting of methyl, ethyl, propyl, isopropyl, butyl and phenyl, and $R_1$'s may be the same or different; and each of $R_2$ and $R_3$ is selected from the group consisting of methyl, ethyl, propyl, isopropyl, butyl, phenyl, diisopropylamide, -p-(t-butyl)$_3$, -p-(phenyl)$_3$, and —Si(CH$_3$)$_3$.

2. The electrolyte additive of claim 1, wherein the nitrogen-containing organic lithium compound further comprises at least one element selected from silicon, sulfur, and oxygen.

3. The electrolyte additive of claim 1, wherein the nitrogen-containing organic lithium compound is represented by Formula (9):

Formula (9)

4. The electrolyte additive of claim 1, wherein the hyper-branched structure material is a nitrogen-containing hyper-branched polymer.

5. The electrolyte additive of claim 1, wherein a monomer of the hyper-branched structure material is at least one compound selected from the group consisting of maleimide, bismaleimide, multi-maleimide, barbituric acid, imidazole, pyrrole, pyridine, pyridazine, pyrimindine, pyradine, triazine, and derivatives thereof.

6. The electrolyte additive of claim 1, wherein a weight ratio of the nitrogen-containing organic lithium compound to the hyper-branched structure material is 1:99 to 99:1.

7. The electrolyte additive of claim 1, wherein the electrolyte additive accounts for 0.1 wt % to 10 wt % of a total weight of an electrolyte solution.

8. A lithium ion secondary battery, comprising:
a positive electrode;
a negative electrode;
a separator film;
an electrolyte solution; and
an electrolyte additive, comprising a nitrogen-containing organic lithium compound and a hyper-branched structure material,
wherein the nitrogen-containing organic lithium compound is represented by one of Formulas (1), (2) and (8):

Formula (1)

Formula (2)

Formula (8)

wherein $R_1$ is selected from the group consisting of methyl, ethyl, propyl, isopropyl, butyl and phenyl, and $R_1$'s may be the same or different; and each of $R_2$ and $R_3$ is selected from the group consisting of methyl, ethyl, propyl, isopropyl, butyl, phenyl, diisopropylamide, -p-(t-butyl)$_3$, -p-(phenyl)$_3$, and —Si(CH$_3$)$_3$.

9. The lithium ion secondary battery of claim 8, wherein the nitrogen-containing organic lithium compound further comprises at least one element selected from silicon, sulfur, and oxygen.

10. The lithium ion secondary battery of claim 8, wherein the nitrogen-containing organic lithium compound is represented by Formula (9):

Formula (9)

11. The lithium ion secondary battery of claim 8, wherein the hyper-branched structure material is a nitrogen-containing hyper-branched polymer.

12. The lithium ion secondary battery of claim 8, wherein a weight ratio of the nitrogen-containing organic lithium compound to the hyper-branched structure material is 1:99 to 99:1.

13. The lithium ion secondary battery of claim 8, wherein the electrolyte additive accounts for 0.1 wt % to 10 wt % of a total weight of the electrolyte solution.

14. The lithium ion secondary battery of claim 8, wherein the negative electrode comprises a negative electrode active substance, and the negative electrode active substance is selected from the group consisting of mesophase carbon micro beads (MCMB), vapor grown carbon fiber (VGCF), carbon nano tubes (CNT), coke, carbon black, graphite, acetylene black, carbon fiber, glassy carbon, lithium alloy, and combinations thereof.

15. The lithium ion secondary battery of claim 8, wherein the negative electrode comprises a negative electrode binder, and the negative electrode binder comprises polyvinylidene fluoride (PVDF), Teflon, styrene-butadiene rubber, polyamide resin, melamine resin, or carboxymethylcellulose (CMC) binder.

16. The lithium ion secondary battery of claim 8, wherein the positive electrode comprises a positive electrode active substance, and the positive electrode active substance is selected from the group consisting of lithiated oxide, lithiated sulfide, lithiated selenide, and lithiated telluride of at least one of vanadium, titanium, chromium, copper, molybdenum, niobium, iron, nickel, cobalt and manganese, and combinations thereof.

17. The lithium ion secondary battery of claim 8, wherein the positive electrode comprises a positive electrode binder, wherein the positive electrode binder comprises PVDF, Teflon, styrene-butadiene rubber, polyamide resin, melamine resin, or CMC binder.

18. The lithium ion secondary battery of claim 8, wherein the positive electrode comprises a conductive additive, wherein the conductive additive is selected from the group consisting of acetylene black, carbon black, graphite, nickel powder, aluminum powder, titanium powder, stainless steel powder, and combinations thereof.

* * * * *